Patented Aug. 21, 1945

2,383,334

UNITED STATES PATENT OFFICE 2,383,334

BETA AMYLOSE-IODINE COMPOUND AND METHODS FOR THE PRODUCTION OF THE SAME

Wallace L. Minto, Jersey City, N. J., assignor of twenty-one and sixty-six hundredths per cent to H. R. Van Deventer, twenty-one and sixty-six hundredths per cent to D. R. Keller, and twenty-one and sixty-six hundredths per cent to E. F. Waller, all of New York, N. Y.

No Drawing. Application May 28, 1943, Serial No. 488,928

4 Claims. (Cl. 260—209)

My invention relates to amylose-iodine compounds and refers particularly to beta amylose-iodine compounds.

The therapeutic value of iodine in the treatment and prevention of thyroid diseases and particularly of endemic goiter and of many other diseases including gastric ulcers has been recognized by the medical profession.

Both the internal and external use of iodine and of many of the iodine compounds suggested for remedial purposes have been ineffective because of their caustic properties and their irritating effect and of their toxicity when taken internally.

Because of these undesirable and dangerous properties, the use of iodine in its free and in its combined condition has been limited, as the employment of sufficient quantity of iodine to produce the desired curative results is impossible without causing serious damage to the body organs.

Many attempts have been made to overcome these obvious objectionable properties of iodine by mixtures of iodine with organic and inorganic chemicals and by forming compounds of iodine with organic and inorganic chemical bases, but the greater number of these mixtures and compounds have proved useless because of their toxicity or because of the small proportion of iodine capable of being incorporated therein.

Mixtures of starch and iodine have been suggested for this purpose but they have been indefinite in composition and hence uncertain in their curative results and have varied greatly in their toxicity, among the reasons for these varying properties being the varying compositions of starch resulting in the production of uncertain compounds, the curative and toxicity properties of which vary greatly.

The object of my invention is a new definite chemical compound produced from beta amylose and iodine, which as a result of many clinical tests has been shown to be particularly non-toxic and to have the desired curative effects for those diseases in which iodine is suggested.

I have found that one mole of pure beta amylose can be combined with three moles of elemental iodine to form a tri-iodide of beta amylose which is stable in liquid form.

Animal tests have shown this new compound of mine to be non-toxic even when taken internally in such quantities that its iodine content exceeds the quantity suggested for the full curative quantity.

Clinical tests have shown that the internal use of my compound produces satisfactory results upon goiter and similar diseases with absence of any toxic results.

I give the following as an example of one method for the production of the compound of my invention:

Twenty-five grams of dry beta amylose are dispersed in 500 c. c. of distilled water at about 25° C., the dispersion is heated slowly to 75° C., with constant stirring, the source of heat is then removed and the resulting solution stirred for about five minutes.

The solution thus formed is cooled to about 45° C. and added to five grams powdered iodine crystals U. S. P. under slow stirring for about five minutes, and the mixture is then allowed to stand until all of the iodine is in complete solution.

The water in the above example may be substituted by other solvents for beta amylose, from among which glycerine is particularly suitable.

While the compound of my invention can be produced from exactly one mole of beta amylose and three moles of iodine, I prefer to employ a slight excess of beta amylose over the theoretical quantity.

The strength of the beta amylose-iodine solution may be varied by varying the amount of water with respect to the amount of beta amylose and iodine, these two compounds always being in the proportion of one mole to three moles; or by slowly and carefully evaporating the original solution.

It is thus evident that the strength of the solution may be readily varied to suit any desired use.

The above example is given solely as one method of producing the compound of my invention, and is not given as a sole method of its production.

The tri-iodide of beta amylose of my invention forms a true solution in water, is dialyzable, the solution selectively absorbs wave lengths above 5500 angstrom units, the band of strongest absorption being between 5650 and 6100 angstrom units and has the following formula:

$$(C_{36}H_{60}O_{30}I_3)_2$$

I do not limit myself to the particular steps of procedure as herein set forth as these are given solely for the purpose of clearly defining my invention.

What I claim is:

1. A process for the production of tri-iodide of beta amylose comprising reacting one mole of substantially pure beta amylose with three moles of iodine in a solvent selected from the group consisting of water and glycerine.

2. A process for the production of tri-iodide of beta amylose comprising reacting one mole of substantially pure beta amylose with three moles of iodine in aqueous solution.

3. A process for the production of tri-iodide of beta amylose comprising reacting one mole of substantially pure beta amylose with three moles of iodine in glycerine solution.

4. The product produced by reacting one mole of substantially pure beta amylose with three moles of iodine in a solvent selected from the group consisting of water and glycerine, which product has therapeutic properties, forms a true solution in water, is dialyzable, the solution selectively absorbs wave lengths above 5500 angstrom units, the band of strongest absorption being between 5600 and 6100 angstrom units and has the formula $(C_{36}H_{60}O_{30}I_3)_2$.

WALLACE L. MINTO.